US008635013B2

(12) United States Patent
Zuccotti et al.

(10) Patent No.: US 8,635,013 B2
(45) Date of Patent: Jan. 21, 2014

(54) COOPERATIVE GEOLOCATION BASED ON INTER-VEHICULAR COMMUNICATION

(75) Inventors: Saverio Zuccotti, Orbassano (IT); Mario Gambera, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 781 days.

(21) Appl. No.: 12/469,610

(22) Filed: May 20, 2009

(65) Prior Publication Data

US 2009/0292459 A1 Nov. 26, 2009

(30) Foreign Application Priority Data

May 20, 2008 (EP) .................................... 08425353

(51) Int. Cl.
*G01C 21/26* (2006.01)
*G08G 1/123* (2006.01)

(52) U.S. Cl.
USPC ........... 701/300; 701/482; 701/301; 340/901; 340/903; 340/438; 340/471; 340/995.12; 455/99; 455/345; 455/456.1

(58) Field of Classification Search
USPC ............ 701/36, 213, 301, 300, 482; 340/431, 340/438, 463, 466, 468, 471, 472, 901–905, 340/995.12; 455/99, 345, 456.1
See application file for complete search history.

(56) References Cited

U.S. PATENT DOCUMENTS 5,801,943 A * 9/1998 Nasburg ........................ 701/117
6,229,438 B1 * 5/2001 Kutlucinar et al. ........... 340/438
6,510,381 B2 * 1/2003 Grounds et al. .............. 701/207
6,577,943 B2 * 6/2003 Nakao et al. .................... 701/80
6,801,837 B2 * 10/2004 Carlstedt et al. .................. 701/1

(Continued)

FOREIGN PATENT DOCUMENTS

WO 2007/089996 A2 8/2007

OTHER PUBLICATIONS

Garmin, "ADS-B Creates a New Standard of Aviation Safety: What is ADS-B?" URL=http://www8.garmin.com/aviation/adsb.html, download date Jun. 11, 2009.

(Continued)

*Primary Examiner* — Drew Brown
*Assistant Examiner* — George Spisich
(74) *Attorney, Agent, or Firm* — Seed IP Law Group PLLC

(57) ABSTRACT

A cooperative event location system is provided having a first system in a first vehicle and a second system. The first system includes a first event detection component to detect an occurrence of an event, a first measurement component to determine a distance traveled from the event, a first processing component coupled to the event detection component and the measurement component to prepare an event message, and a first short-range communication component coupled to the processing component and configured to transmit the event message to the second system remote from the first system. The second system includes a second short-range communication component to receive the event message, a satellite navigation component to provide location information, and a processing component coupled to the second communication component and the satellite navigation component to determine in latitude and longitude coordinates a location of the event.

24 Claims, 3 Drawing Sheets

(56) References Cited

U.S. PATENT DOCUMENTS

| | | | | |
|---|---|---|---|---|
| 6,978,206 | B1 * | 12/2005 | Pu et al. | 701/200 |
| 7,246,009 | B2 * | 7/2007 | Hamblen et al. | 701/209 |
| 7,304,589 | B2 * | 12/2007 | Kagawa | 340/995.13 |
| 7,778,770 | B2 * | 8/2010 | Sakagami et al. | 701/200 |
| 2003/0125845 | A1 * | 7/2003 | Carlstedt et al. | 701/1 |
| 2007/0179681 | A1 | 8/2007 | Shaffer et al. | |
| 2007/0197230 | A1 * | 8/2007 | Roggero et al. | 455/456.1 |

OTHER PUBLICATIONS

Air Traffic Services Brief: Automatic Dependent Surveillance-Broadcast (ADS-B), URL=http://www.aopa.org/whatsnew/air_traffic/ads-b.html, download date Jun. 11, 2009.

Simonds, F., "Look Ma—No Radar! Tomorrow's Air Traffic Control," URL=http://www.aviation.com/technology/080118-ads-b-air-traffic-control.html, download date Jun. 11, 2009.

* cited by examiner

COOPERATIVE GEOLOCATION BASED ON INTER-VEHICULAR COMMUNICATION

BACKGROUND

1. Technical Field

The present invention relates to cooperative geolocation of an event based on inter-vehicular communication.

2. Description of the Related Art

As is known, stand-alone geolocation (also referred to as georeferencing) of an event by a motor vehicle often requires the availability of an on-board satellite location or navigation system (GPS receiver) for geolocating the event, and, possibly, of a long-range communication system for signaling the geolocated event to a remote service center.

However, on the current automotive market only a few motor vehicles, generally high-range ones, have complete telematic equipment such as to enable stand-alone geolocation of an event. One of the scenarios for the near future envisages, however, a total diffusion of motor vehicles with minimal telematic equipment with a single short/medium range communication system without a satellite location system or a long-range communication system.

BRIEF SUMMARY

The aim of the present invention is to provide a system for cooperatively geolocating an event that will eliminate or at least reduce the dependence upon the characteristics of the telematic equipment of motor vehicles in such a way as to enable also motor vehicles without a satellite location system to contribute to geolocating events that have occurred along their path.

According to the present invention a system for cooperative geolocation based on inter-vehicular communication is provided as defined in the appended claims.

BRIEF DESCRIPTION OF THE SEVERAL VIEWS OF THE DRAWINGS

For a better understanding of the present invention a preferred embodiment is now described, purely by way of non-limiting example, with reference to the attached pages of drawings, wherein.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with vehicles and communication devices have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. The idea underlying the present invention is to cooperatively geolocate an event encountered by a motor vehicle by exploiting inter-vehicular (vehicle-to-vehicle—V2V) communication. Through short-range communication the vehicle that experiences the event on a road can notify another vehicle on the same road of the existence of the event. The vehicle receiving notification of the event can determine a location of the event. With the location of the event the other vehicle can send the information to a remote date center if it is equipped with a satellite navigation system, it can inform its operator, and it can transmit the information to other vehicles it passes. Once informed, the operator of the vehicle can avoid or maneuver accordingly prior to encountering the event.

Inter-vehicular communication increases safety on roads by enabling motor vehicles to communicate with one another to rapidly exchange information when in close proximity to each other. For example, two motor vehicles may exchange information about events they encountered along their respective paths when they are within a range of one hundred meters.

Figure 1:
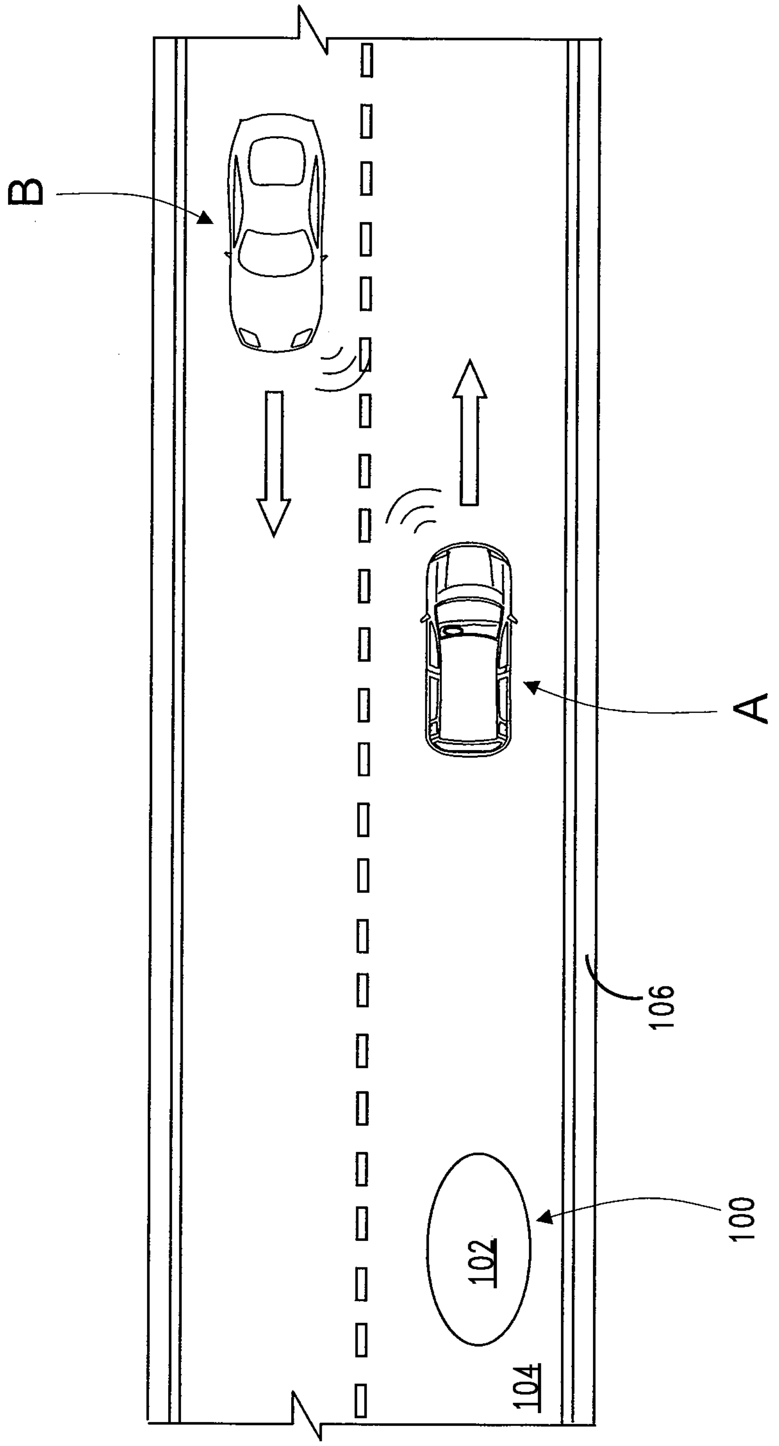
FIG. 1 schematically shows the inventive principle underlying the cooperative geolocating system according to the present invention.

FIG. 1 schematically shows one embodiment of a cooperative geolocating system according to the present invention. In particular, FIG. 1 shows a scenario wherein a generic motor vehicle wishes to signal to other motor vehicles the presence and position of an event 100 that has occurred along its own path. For convenience of illustration and represented by way of example in FIG. 1 is the event 100 constituted by a rut 102 in a road 104. The event 100 may be an obstacle on the road 104 such as a downed tree, tire debris from a flat tire, a disabled vehicle, an accumulation of water, construction, or other physical obstruction on the road 104. The event 100 may also be damage to the road 104 such as a crack in the asphalt, a pot hole, or other hazardous condition. Additionally, the event 100 may be on a shoulder 106 of the road 104 such as a damaged guard rail or a police officer checking for speeders.

For convenience of exposition, in the ensuing description, as likewise in FIG. 1, the motor vehicle without the GPS receiver that is the first to detect the event 100 and wishes to warn other motor vehicles of the presence and position of the event will be designated by the letter A. In addition, FIG. 1 also shows a second motor vehicle, designated by the letter B, that is travelling along the same stretch of road 104 as the motor vehicle A, but in an opposite direction, and that will cooperate with the motor vehicle A for determining the location the event 100 detected by the latter. The vehicle B can also be traveling in the same direction as vehicle A, but behind it or ahead of it.

At the moment when the motor vehicle A detects the presence of the event 100, it outputs a signal to determine whether there are any other motor vehicles, such as motor vehicle B that are equipped with an inter-vehicular communication system in the communication range of its own inter-vehicular communication system. The motor vehicle A is equipped with a short-range inter-vehicle communication system, such as a transceiver, to communicate to other transceivers within the selected range of the motor vehicle A.

The inter-vehicle communication systems used for transmitting and receiving event messages may communicate in a variety of ways. The inter-vehicle communication systems may use radio frequency communication, optical communication, or other wireless forms of communication. In one embodiment, the inter-vehicle communication systems are short-range systems that communicate with each other only when they are in direct radio visibility.

When a motor vehicle equipped with an inter-vehicular communication system, in FIG. 1 represented by the motor vehicle B, enters the range of communication of the inter-vehicular communication system of the motor vehicle A, i.e., becomes reachable, the motor vehicle A communicates to the motor vehicle B an event message containing information, such as the presence and type of the detected event 100 and the distance covered thereby from the detected event 100. The motor vehicle B may then process the event message to determine when and if the motor vehicle B will experience the event. A driver of the motor vehicle B may be notified of the event location and the event type so that the driver may exercise more care when passing the event. For example, if a vehicle is stalled along a shoulder of a narrow road, motor vehicle A may transmit to motor vehicle B the type of event, the stalled vehicle, and motor vehicle A's distance from the event. The motor vehicle B may process the event information and alert its driver to take caution upon passing the stalled vehicle.

Alternatively or additionally, the motor vehicle A may repeat the event message to other vehicles on the same road 104 after interacting with the motor vehicle B. After motor vehicle B passes or experiences the event it may also transmit information about the event to other vehicles traveling towards the event. The motor vehicle B may detect the event with its own sensors and prepare a separate event message. Additionally, the motor vehicle B may combine the information from its own sensors with the information from the motor vehicle A. For example, if the motor vehicle A and the motor vehicle B are travelling in opposite directions and the event is only on the motor vehicle A's side of the road, the motor vehicle B can prepare an event message with information from the motor vehicle A's message and a distance that the motor vehicle B has traveled from the event location. Vehicle B can then send a message having the event information and location to a third vehicle C that is traveling in the same direction as vehicle A.

If the motor vehicle B is equipped with a GPS receiver, it can process the event message transmitted by the motor vehicle A and, with appropriate computations regarding its own direction of travel with respect to the motor vehicle A, can compute the position, in latitude and longitude coordinates, of the event 100. The motor vehicle B may use this information to maneuver accordingly when encountering the event. Additionally, the motor vehicle B may transmit the latitude and longitude position information of the event to a remote data center that monitors road conditions.

Various types of events can occur along the path of the motor vehicle A and can be detected by the event detection system in various ways. In particular, the event detection system may detect the event automatically via a purposely provided sensor system. For example, in the case of the rut 102, detection may be achieved via smart tires, vision sensors arranged at the front of the motor vehicle A, signals from the CAN network of the motor vehicle A such as signals indicating activation of an anti-skid system. For some events, vehicle A's sensor and computer systems determine that an event has occurred and send out the event message without interaction from a person in the vehicle. The vehicle computer system may report the sending of the event message to the driver, or it may be configured to not send any notification of the sending of the event message. The human-machine interface may be configured to enable a user (driver or passenger) to indicate, manually or vocally, an occurrence of the event 100 and identification of the type of event 100. This can be done by entering a code into a key pad, such as a radio or audio system, indicating the type of event if desired. For example, if the user observes a broken down car, an accident, a tree on the road or a police officer looking for speeders, the user may manually enter in the event information about the event and type into the system. In addition, the distance covered by the motor vehicle A from detection of the event 100 can be measured by the latter in various ways, for example directly by means of an on-board odometer that is reset automatically or manually upon detection of the event 100 and that is progressively incremented automatically as the motor vehicle A moves away from the detected event 100. Alternatively, the distance covered by the motor vehicle A from detection of the event 100 could also be measured indirectly based on the speed of travel of the motor vehicle A and of the time that has elapsed from detection of the event 100.

If the motor vehicle A is not equipped with a satellite navigation system, such as a GPS receiver, then the motor vehicle A is not enabled to transmit longitude and latitude information to motor vehicle B. To determine the location of the event 100 detected by the motor vehicle A, the motor vehicle B may first determine its own direction of travel with respect to that of the motor vehicle A. In order to do this, the motor vehicle B periodically queries ("pings") the motor vehicle A, sending appropriate ping messages in order to check radio reachability continuously. The ping messages periodically determine if the motor vehicle A is within the selected range of the motor vehicle B. Upon receipt of each ping the motor vehicle A may send a corresponding reply message. Based on the time during which the motor vehicles A and B remain in direct radio visibility, i.e., are within range to communicate directly, and based on its own speed of travel, the motor vehicle B can determine its own direction of travel with respect to that of the motor vehicle A. Optionally, in order to make determination of the direction of travel more robust, the motor vehicle A could send the reply message containing its own current speed.

For example, if the communication range of the inter-vehicular communication systems of the motor vehicles A and B is on average approximately some fifty meters and both of the motor vehicles proceed at the same speed of 50 km/h and remain in radio visibility for a time longer than a certain value, for example a couple of seconds, then the motor vehicle B is able to establish that the motor vehicle A is travelling in the same direction (the motor vehicles A and B are one behind the other).

Alternatively or additionally, the motor vehicle B may determine a distance between it and the motor vehicle A by using a sonar system, an infrared or other optical system, or a radio frequency system. For example, a Doppler shift sensing system, whether sonar, radar, or optical, may be utilized to determine the relative distance between the vehicles and to determine a relative speed of the other vehicle. A series of algorithms may process the relative distance and relative speed in conjunction with the event message to determine the location of the event using techniques well known in the art.

Once the motor vehicle B has determined its own direction of travel with respect to the motor vehicle A, it can then proceed with processing of the information of distance covered by the motor vehicle A from the detected event 100 contained in the event message sent by the latter in order to locate the event 100. For instance, in the case where the motor vehicles A and B are travelling in opposite directions and the motor vehicle A has communicated to the motor vehicle B that it has covered a given distance, for example, 1 km, from detection of the event 100, then, if the motor vehicle B continues to travel in the opposite direction along the same stretch of road as the motor vehicle A, it will reach the position corresponding to the event 100 only after it also has covered said distance. Consequently, the motor vehicle B determines its own distance from the event 100 detected by the motor vehicle A based on the information of distance covered by the motor vehicle A from the detected event 100 contained in the message sent by the latter, then resets its own on-board odometer or else sets it at said given distance, and then increments it or else, respectively, decrements it progressively as it approaches the event 100, until said distance is covered.

By way of example, the distance between the motor vehicle B and the event 100 could be determined by the latter by increasing the distance that has been communicated thereto by the motor vehicle A (distance between the motor vehicle A and event 100) by an amount equal to the communication ranges of the inter-vehicular communication systems of the two motor vehicles A and B.

Alternatively, the motor vehicle A could be configured for transmitting repeatedly its own distance from the event 100, and the motor vehicle B could be configured for estimating the point in which it crosses the motor vehicle A as intermediate point between the point in which the inter-vehicular communication started and that in which it is concluded, and hence use the distance between the event 100 and the motor vehicle A transmitted by the latter in the point where the two motor vehicles come to cross each other.

Irrespective of how the motor vehicle B determines its own distance from the event 100 detected by the motor vehicle A, once the motor vehicle B has covered said distance, if it is equipped with the GPS receiver, it will be able to locate the event (i.e., provide its latitude and longitude) and in turn propagate to other motor vehicles the information of the presence of the event 100 generated by the motor vehicle A, enriched with information of position (latitude and longitude) generated thereby. In the case where the motor vehicle B is also equipped with a long-range communication system, this information could then also be transmitted to a remote service center.

In addition, in the case where the motor vehicle B is also equipped with an on-board navigator with roadmaps, a roadmap navigator that may be included in a GPS receiver, it may process the location of the event immediately upon receipt of the event message. The motor vehicle B may, upon notification of the event 100 from the motor vehicle A, based on the information of relative distance between the event 100 and the motor vehicle A, on its own current position, and on the roadmaps, immediately estimate the position of the event 100 even before passing or even without passing the event.

In addition, in order to prevent erroneous geolocation of the event 100, the motor vehicles A and B can conveniently implement appropriate exclusion policies. For example, the motor vehicle A could decide not to propagate the event message before crossing the motor vehicle B, at least once one of the direction indicators has been operated, this being a sign that the motor vehicle A has probably made a turn. Likewise, the motor vehicle B could decide not to locate the event 100 signaled by the motor vehicle A if it has made a turn just after it has crossed the motor vehicle A. In addition, in the case where the geolocated events have also been signaled to a remote service center, the latter could adopt appropriate filtering logics to filter spurious notifications, i.e., the event 100 could be accepted and validated only after an appropriate number of notifications by different motor vehicles.

In addition, policies may then be envisaged for interruption of signaling, by the motor vehicle A, of the event 100 detected thereby. For example, the motor vehicle A could interrupt signaling of the detected event 100 when it receives a notification of geolocation having been made by another motor vehicle equipped with a satellite location system, or else, given that the detection of the event has in general a limited validity in time, once a given time of validity of detection has elapsed.

In addition, in the case where the motor vehicle B is not equipped with a satellite location system that would enable geolocation thereby of the event 100 detected by the motor vehicle A, the motor vehicle B could be configured for warning in any case other motor vehicles that it crosses along its path of the presence of the event 100 originally detected by the motor vehicle A and of the motor vehicle B's distance from said event 100.

Alternatively or additionally, a fixed transceiver may be positioned intermittently along the road 104 for receiving event messages. The fixed transceiver may have a satellite navigation system for assisting in determining the location, in latitude and longitude coordinates, of the event. In addition, the fixed transceiver may have a long range communication system that can transmit the event message and location information from the satellite navigation system to a remote data center. The fixed transceiver may also be configured to transmit the event message to other vehicles that are heading towards the event. In this case, one of the exclusion policies may stop the motor vehicle A from transmitting the event message to other vehicles it passes after transmitting the event message to the fixed transceiver.

Based on the above description, the event message sent by the motor vehicle A that wishes to warn other motor vehicles of the occurrence of the event 100 could have the following format:

ID_event: a conventional code that describes the type of the event 100, such as the rut 102;

Timestamp: the time at which the event 100 has been triggered/detected;

Timestamp_type: a flag that specifies whether the time is absolute, for example obtained from a GPS, or relative, or simply obtained from a clock on the on-board panel (and hence potentially incorrect);

CurrentSpeed: the current speed of the motor vehicle that transmits the information;

EventDistance: the distance from the event 100, which may be incremented by the motor vehicles that are moving away from the event 100 and decremented by the ones that are approaching the event 100;

GPScoord: GPS co-ordinates of the event 100 (only for motor vehicles equipped with a GPS receiver); and GPScoord_type: a flag that specifies whether the co-ordinates are real or estimated using maps of the navigator (only for motor vehicles equipped with a GPS receiver).

Further fields could then be added according to the application, for example:

ID_source: a unique identifier of the motor vehicle that detected and generated the event message about the event 100;

LastHopTimestamp: a timestamp of the last hop of the message where hop is a transmission of the event message from one vehicle to another;

LastHopTimestamp_type: a flag that specifies whether the time is absolute or relative; and HopNumbers: a counter incremented each time a motor vehicle receives and transmits the same message.

Figure 2:
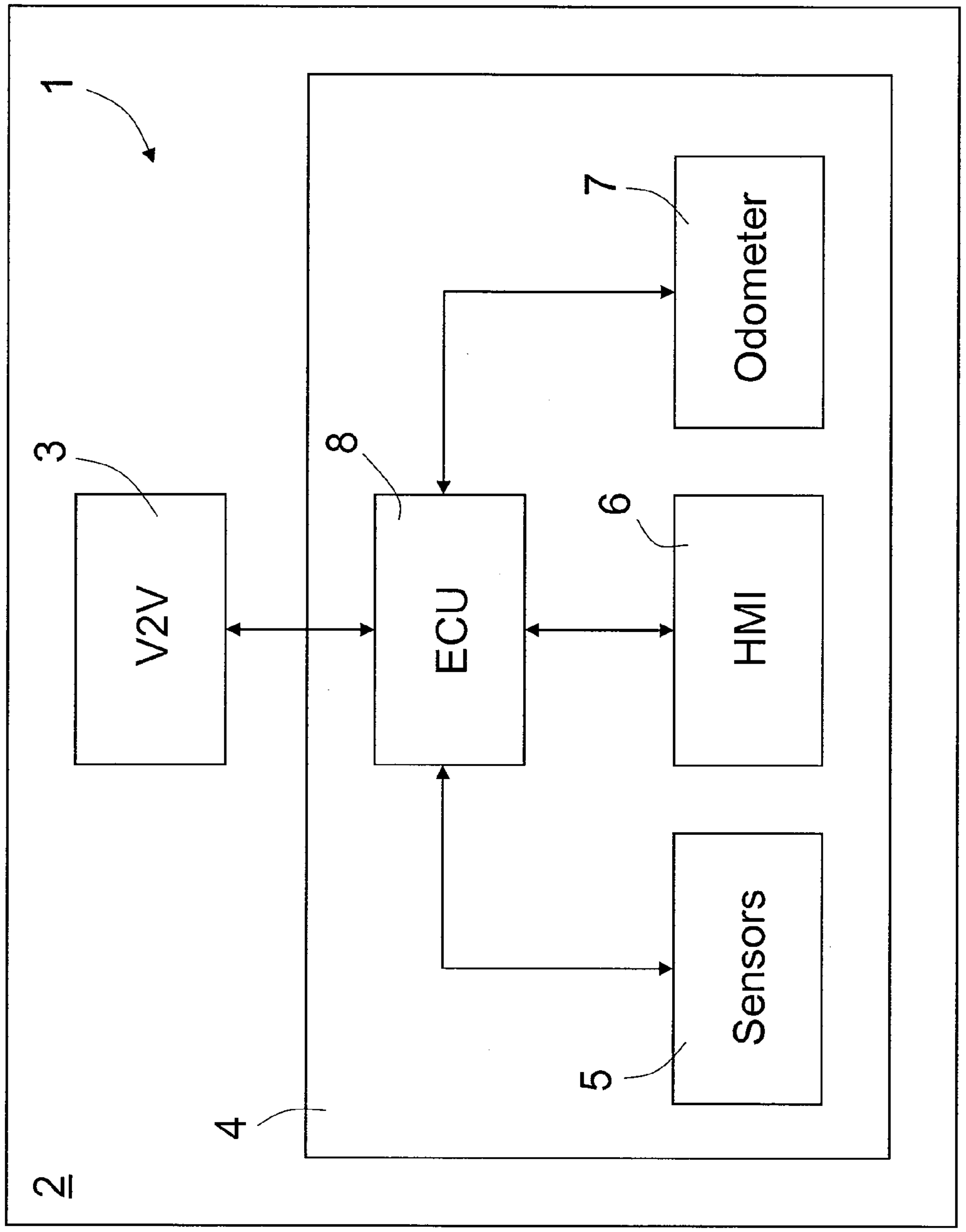
FIGS. 2 and 3 show block diagrams of the infotelematic equipment of two motor vehicles for providing a cooperative geolocating system according to one embodiment of the present invention.

FIG. 2 shows a block diagram of a first infotelematic system 1 of a first vehicle 2 in accordance with one embodiment of the present invention. In particular, the first vehicle 2 may be a motor vehicle that is not equipped with a satellite navigation system (GPS receiver). The first vehicle 2 is equipped with a first geolocation system 4 to enable the first vehicle 2 to contribute to cooperative geolocation of events in the way described above.

In particular, the infotelematic system 1 includes, amongst other things a short-range communication component that may be referred to as an inter-vehicular (V2V) communication system 3. The inter-vehicular communication system 3 may be based upon one of the currently available technologies such as radio frequency communication, e.g., 802.11, ZigBee, etc., optical communication, or other wireless forms of communication and may be configured for automatic detection of the presence of other inter-vehicular communication systems. The short-range communication component may limit communication from the first vehicle 2 to other vehicles within a predetermined range of the first vehicle 2 and may not be configured for long range communication.

The infotelematic system 1 also includes the first geolocation system 4 coupled to the inter-vehicle communication system 3 and configured for cooperating with a second geolocation system of another vehicle within the range of the first vehicle 2. The first and second geolocation systems provide a cooperative geolocation system that enables location of an event detected by the first vehicle 2.

In particular, the geolocation system 4 may include an event detection component, a measurement component, and a processing component. The event detection component may be a sensor system 5, which enables automatic detection and identification of events. The sensor system 5 may include, among other things, smart tires, vision sensors, accelerometers, or other types of sensors for detection of specific events. The sensor system 5 may be supplemented by a human-machine interface 6 that can be used by a user, an operator or passenger, for indicating the occurrence of the event. The human-machine interface 6 may be used in combination with or as an alternative to the sensor system 5 to signal and identify the event detected by the user. For example, if a large boulder has fallen along a shoulder of a road but is not obstructing the road the sensor system 5 may not detect the presence of this event. However, the user, i.e., one of the occupants of the vehicle, may enter information about the boulder. Once processed the geolocation system 4 can transmit the event message to other vehicles and onto a remote data center. Road crews may monitor these data centers to determine where obstacles or dangerous conditions are located.

The geolocation system 4 also includes the measurement component that may be an odometer 7 or equivalent measuring device for the measurement, whether direct or indirect (i.e., through a measurement of speed and time), of the distance covered by the first vehicle 2 from detection of the event.

The geolocation system 4 also includes the processing component referred to as an electronic processing and control unit (ECU) 8 connected to the communication component (inter-vehicle component 3), the event detection component (sensor system 5 and the human-machine interface 6), and the measurement component (odometer 7). The electronic processing and control unit 8 processes the signals coming from the event detection component such as the on-board sensor system 5 or signals present on the CAN network of the motor vehicle for automatic detection and identification of the events. The electronic processing and control unit 8 is configured to prepare an event message that includes information such as a distance traveled from the occurrence of the event, an identity of the event, and a current speed of the first vehicle 2. The electronic processing and control unit 8 is also configured to exchange with other inter-vehicular communication systems of other vehicles, through the inter-vehicular communication system 3, the event messages of the type described above. The electronic processing and control unit 8 may also determine the relative direction of travel of the vehicles and may implement the policies of exclusion and interruption of the warning described above.

Figure 3:
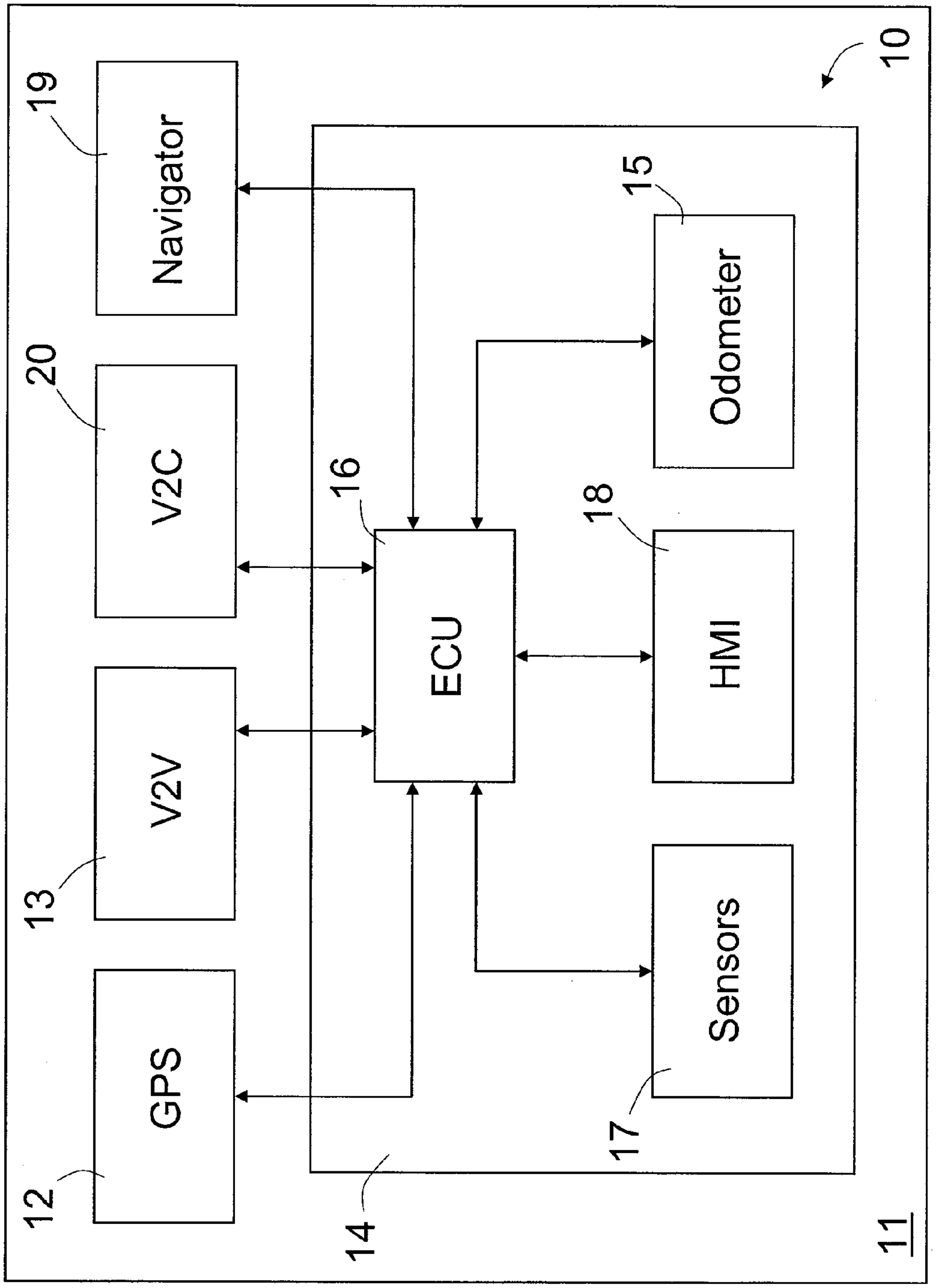

FIG. 3 shows a block diagram of a second infotelematic system 10 of a second vehicle 11, in particular a motor vehicle that may enable the vehicle 11 to contribute to the cooperative geolocation of events in accordance with one embodiment of the present invention. As with the first infotelematic system 1 of FIG. 2, the second infotelematic system includes a second geolocation system 14. The second geolocation system 14 may include the same components as the first geolocation system 4, i.e., the event detection component, the measurement component, and the processing component.

In particular, the processing component of the infotelematic system 10 may include a second electronic processing and control unit 16 that is coupled to a sensor system 17, a human-machine interface 18, and an odometer 15. In addition, the electronic processing and control unit 16 may be coupled to other systems that may include an autonomous satellite navigation system (a GPS receiver) 12, an inter-vehicle (V2V) communication system 13, a long-range communication system (V2C) 20, and a roadmap navigator. The inter-vehicle communication system 13 may be identical to the inter-vehicle communication system 3 of FIG. 2.

The geolocation system 14 having the electronic processing and control unit 16 is configured for cooperating with the geolocation system 4 of the first vehicle 2 to provide the cooperative geolocation system according to the present invention for locating the event detected by the first vehicle 2. The odometer 15 or equivalent measuring device for the measurement, whether direct or indirect (i.e., through a measurement of speed and time) determines a second distance traveled by the second vehicle 11 after receiving the event message from the first vehicle. From the moment in which it receives a warning of the event detected by the geolocation system 4 of the first vehicle 2 the second vehicle starts processing the event message and the distances traveled to determine the location of the event.

The electronic processing and control unit 16 may query the first vehicle 2 to determine the first vehicle's 2 current speed of travel. The electronic processing and control unit 16 of the second vehicle 11 may send ping message requesting information such as speed of travel. The electronic processing and control unit 8 of the first vehicle 2 may process the ping messages and prepare reply messages containing the requested information. The second vehicle 11 can thereby determine the relative direction of travel and locate the event detected by the first geolocation system 4 in the way described above. The second electronic processing and control unit 16 of the second vehicle 11 can implement the policies of exclusion and interruption of warning described above and propagate the information of presence of and distance from the event detected by the first vehicle 2. If the second vehicle 11 has the satellite navigation system 12 the electronic processing and control unit 16 may transmit the event message and other information to a remote data center. The remote data center may then inform other cars equipped with a long-range communication device of the event. However, in the case where the second vehicle 11 is not equipped with the satellite navigation system 12 the second vehicle 11 may continue to transmit the event message to other vehicles within the range of its short-range communication component.

In motor vehicles that have a roadmap navigation system 19 and a long-range, extra-vehicular communication system 20, the electronic processing and control unit 16 may estimate the position of the event based on the roadmaps of the roadmap navigation system 19 even before passing, or even without passing, the event, and may transmit the geolocated events to a remote service or data center through the extra-vehicular communication system 20.

The geolocation systems described above may be included in vehicles with or without satellite navigation systems to transmit event information to other vehicles on the road. For example, if a first vehicle having a first geolocation system and a satellite navigation system encounters an event along a path, the first vehicle may transmit information about the event, including latitude and longitude coordinates from the satellite navigation system to a remote center and to other vehicles with satellite navigation systems. Simultaneously, the first vehicle may process and transmit an event message that includes its distance from the event to other vehicles with in a range that have a geolocation system, but do not have a satellite navigation system. The receiving geolocation system can process the event message and approximate a location of the event.

As mentioned above, the geolocation systems may be used by two vehicles having inter-vehicle communication systems to warn each other of events along a road when neither vehicle includes a satellite navigation system. In this embodiment, a first vehicle detects an event through its geolocation system, prepares an event message, and transmits the event message when the other vehicle is within a range of the first vehicle. The other vehicle may process the event message including the first vehicle's distance from the event and approximate a location of the event.

From an examination of the characteristics of the cooperative geolocation system according to the present invention, the advantages that the latter makes available are evident. In particular, it is emphasized that the cooperative geolocation system enables geolocation of the event in a simple and inexpensive way by exploiting inter-vehicular communication and without requiring any particular intervention of the telematic equipment of the motor vehicles. This also enables motor vehicles that are not equipped with a satellite location or navigation systems to contribute to geolocating events that have occurred along their path.

Finally, it is clear that modifications and variations may be made to what has been described and illustrated herein, without thereby departing from the sphere of protection of the present invention, as defined in the appended claims. For example, the on-board sensor system for detection and identification of the events, as well as the modalities with which a motor vehicle determines its own direction of travel with respect to another motor vehicle or measures the distance from an event can differ from the ones described previously and can be chosen as required based on the specific desired application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An automotive cooperative geolocation system based on inter-vehicular communication, comprising:

- a first geolocation system configured to be arranged in a first vehicle equipped with a first inter-vehicular communication system; and
- a second geolocation system configured to be arranged in a second vehicle equipped with a second inter-vehicular communication system and with an on-board satellite navigation system;
- the first and second inter-vehicular communication systems being configured to automatically detect other inter-vehicular communication systems within a communication range and to initiate communications between the first and the second inter-vehicle communications systems and the other inter-vehicular communication systems only after detecting the other inter-vehicular communication systems; and
- the first and second geolocation systems being configured to cooperate with one another for geolocating an event detected by the first geolocation system;
- the first geolocation system comprising:
  - a first event detection unit configured to detect and identify events that have occurred along a path of the first vehicle;
  - a measurement unit configured to supply information indicating a distance covered by the first vehicle from the detected event;
  - a first electronic processing and control unit configured to generate and transmit, through the first inter-vehicular communication system of the first vehicle, information indicating the detected event and the distance covered by the first vehicle from the detected event;
- the second geolocation system comprising:
  - a second electronic processing and control unit configured to extract the information transmitted by the first inter-vehicular communication system of the first vehicle and received through the second inter-vehicular communication system to geolocate the detected event in longitude and latitude coordinates based on the distance covered by the first vehicle from the detected event.

2. The automotive cooperative geolocation system of claim 1, wherein the first electronic processing and control unit of the first geolocation system is further configured to generate and transmit, through the first inter-vehicular communication system of the first vehicle, the information upon detection of the second inter-vehicular communication system of the second vehicle within the communication range of the first inter-vehicular communication system of the first vehicle.

3. The automotive cooperative geolocation system of claim 1, wherein the second electronic processing and control unit of the second geolocation system is further configured to:

determine a direction of travel of the second vehicle with respect to the first vehicle; and geolocate the detected event based on the position information supplied by an on-board satellite navigation system of the second vehicle, the distance covered by the first vehicle from the detected event, and the direction of travel of the second vehicle with respect to the first vehicle.

4. The automotive cooperative geolocation system claim 3, wherein the second electronic processing and control unit of the second geolocation system is further configured to:

generate ping messages for monitoring reachability of the first vehicle;

transmit the ping messages periodically through the second inter-vehicular communication system of the second vehicle to the first inter-vehicular communication system of the first vehicle; and determine the direction of travel of the second vehicle with respect to the first vehicle based on a time during which the first and second inter-vehicular communication systems of the first and second vehicles remain reachable.

5. The automotive cooperative geolocation system of claim 4, wherein the first electronic processing and control unit of the first geolocation system is further configured to generate reply messages in response to the ping messages transmitted by the second vehicle and transmit the reply messages through the first inter-vehicular communication system of the first vehicle to the second inter-vehicular communication system of the second vehicle.

6. The automotive cooperative geolocation system of claim 5, wherein the reply messages contain information indicating a current speed of travel of the first vehicle.

7. The automotive cooperative geolocation system of claim 3, wherein the second geolocation system further comprises a second measurement unit configured to measure a second distance covered by the second vehicle; and wherein the electronic processing and control unit of the second geolocation system is further configured to geolocate the detected event based on the position information supplied by the on-board satellite navigation system, the second measurement unit of the second vehicle, and on the direction of travel of the second vehicle with respect to the first vehicle.

8. The automotive cooperative geolocation system of claim 3, wherein the second vehicle is further equipped with a roadmap navigation system; and wherein the electronic processing and control unit of the second geolocation system is configured to geolocate the detected event based on the information supplied by the on-board satellite navigation system of the second vehicle, the distance covered by the first vehicle from the detected event, the direction of travel of the second vehicle with respect to the first vehicle, and the roadmap navigation system.

9. The automotive cooperative geolocation system of claim 1, wherein the second vehicle is further equipped with an extra-vehicular communication system for long-range communication, and the electronic processing and control unit of the second geolocation system is further configured to signal the geolocated events to a remote service center through the extra-vehicular communication system of the second vehicle.

10. The automotive cooperative geolocation system of claim 1, wherein the second geolocation system further comprises a second event detection unit configured to detect and identify events that have occurred along a path of the second vehicle.

11. The automotive cooperative geolocation system of claim 1, wherein the first event detection unit comprises sensors.

12. The automotive cooperative geolocation system of claim 1, wherein the first event detection unit comprises a human-machine interface configured to enable a user to signal and identify the detected event.

13. An event location system, comprising:

a first vehicle having a first geolocation system coupled to a first inter-vehicle transceiver system;

the first geolocation system comprising:

an event detection component adapted to detect an occurrence of the event;

a measurement component adapted to determine a distance travelled from the occurrence of the event; and a processing and control component adapted to prepare an event message that includes the distance travelled from the event and to initiate a transmission of the event message through the first inter-vehicle transceiver system only after a second inter-vehicle transceiver system is detected by the first inter-vehicle transceiver system; and a second vehicle having a second geolocation system coupled to a second inter-vehicle transceiver system that receives the event message from the first inter-vehicle transceiver system;

the second geolocation system, comprising:

a satellite navigation component adapted to provide location information of the second vehicle; and a second processing and control component adapted to process the event message from the first inter-vehicle transceiver system with location information from the satellite navigation component to determine in latitude and longitude coordinates a location of the event.

14. The event location system of claim 13 wherein the second vehicle includes a long-range communication component adapted to transmit the location of the event to a remote data center.

15. The event location system of claim 13 wherein the event message transmitted by the first vehicle to the second vehicle includes at least one from among the distanced travelled from the event, a type of the event, and a speed of the first vehicle.

16. The event location system of claim 13 wherein the second processing and control component is configured to determine a direction of travel of the first vehicle with respect to the second vehicle and process the direction of travel with the event message and the location information to locate the event.

17. The event location system of claim 16 wherein the second processing and control component determines the direction of travel of the first vehicle by periodically transmitting ping messages to the first vehicle and determining a time interval during which the first vehicle is within a second communication range of the second vehicle.

18. The event location system of claim 17 wherein the first vehicle transmits reply messages in response to the ping messages.

19. The event location system of claim 18 wherein the reply messages include a current speed of travel of the first vehicle.

20. The event location system of claim 13 wherein the second vehicle includes a second measurement component configured to determine a second distance travelled by the second vehicle since receiving the event message.

21. The event location system of claim 13 wherein the first event detection component includes sensors for detecting the event.

22. A method of cooperatively locating an event, comprising:

detecting the event by a first vehicle having event sensors;

determining a distance travelled by the first vehicle from the event;

preparing an event message that includes the distance travelled from the event;

determining when a second vehicle is within a selected communication range of the first vehicle;

transmitting the event message to the second vehicle only after the second vehicle is detected by the first vehicle; and processing the event message by the second vehicle to determine a location of the event in longitude and latitude coordinates.

23. The method of claim 22 wherein the selected communication range of the first vehicle is within 100 meters.

24. The method of claim 22, further comprising determining position information of the second vehicle from an on-board satellite navigation system; and processing the position information with the event message to determine a location of the event in latitude and longitude coordinates.

* * * * *